(12) United States Patent
Ding et al.

(10) Patent No.: US 11,288,516 B2
(45) Date of Patent: Mar. 29, 2022

(54) VIDEO RATING METHOD, VIDEO RATING DEVICE, EQUIPMENT AND STORAGE MEDIUM

(71) Applicant: BEIJING DAJIA INTERNET INFORMATION TECHNOLOGY CO., LTD., Beijing (CN)

(72) Inventors: Wenkui Ding, Beijing (CN); Di Li, Beijing (CN); Yan Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/844,535

(22) Filed: Apr. 9, 2020

(65) Prior Publication Data
US 2020/0257903 A1   Aug. 13, 2020

(30) Foreign Application Priority Data

Apr. 29, 2019 (CN) .......................... 201910355336.2

(51) Int. Cl.
  *G06K 9/62*  (2006.01)
  *G06K 9/00*  (2022.01)
  *G06N 3/04*  (2006.01)

(52) U.S. Cl.
  CPC ..... *G06K 9/00744* (2013.01); *G06K 9/00718* (2013.01); *G06K 9/6262* (2013.01); *G06N 3/04* (2013.01)

(58) Field of Classification Search
  CPC ........... G06K 9/00744; G06K 9/00718; G06K 9/6262; G06K 9/629; G06K 9/627; G06N 3/04; G06N 3/088; G06N 3/0454; H04N 21/44008; H04N 21/462
  See application file for complete search history.

(56) References Cited

U.S. PATENT DOCUMENTS

| | | | |
|---|---|---|---|
| 10,643,074 B1 * | 5/2020 | McAninly | G06K 9/00744 |
| 10,671,854 B1 * | 6/2020 | Mahyar | G06K 9/00751 |
| 10,701,175 B1 * | 6/2020 | Kolcz | G06Q 30/00 |
| 2009/0052784 A1 | 2/2009 | Covell et al. | |
| 2018/0121533 A1 * | 5/2018 | Magnani | G06F 16/248 |

(Continued)

FOREIGN PATENT DOCUMENTS

| | | |
|---|---|---|
| CN | 106485226 A | 3/2017 |
| CN | 108427713 | 8/2018 |
| CN | 109168024 | 1/2019 |

(Continued)

*Primary Examiner* — Dhaval V Patel
(74) *Attorney, Agent, or Firm* — Meunier Carlin & Curfman LLC

(57) ABSTRACT

The present disclosure relates to a video rating method, a video rating device, equipment and a storage medium, relating to the field of multimedia. An embodiment of the present disclosure provides a method for automatically rating a video based on features of multiple modals of the video and rating embedding modes. By fusing the features of the multiple modals of the video, the rating of the video is converted into rating embedding in a vector space, and a matching degree between a target feature fusing with the multiple modals and each rating embedding is acquired, the rating of the video is predicted according to the matching degree corresponding to each rating embedding, and the video rating efficiency and accuracy can be improved.

21 Claims, 5 Drawing Sheets

(56) References Cited

U.S. PATENT DOCUMENTS

2018/0293488 A1* 10/2018 Dang .................... G06N 3/082
2018/0359477 A1* 12/2018 Yang .................... H04N 19/139

FOREIGN PATENT DOCUMENTS

| CN | 109190482 | 1/2019 |
| CN | 109359636 | 2/2019 |
| CN | 109684506 | 4/2019 |
| CN | 109447125 | 12/2019 |

* cited by examiner

VIDEO RATING METHOD, VIDEO RATING DEVICE, EQUIPMENT AND STORAGE MEDIUM

CROSS REFERENCE TO RELATED APPLICATIONS

This application claims priority to Chinese Patent Application No. 201910355336.2, filed on Apr. 29, 2019, which is hereby incorporated by reference in its entirety.

FIELD

The present disclosure relates to the field of multimedia, in particular to a video rating method, a video rating device, equipment and a storage medium.

BACKGROUND

With the development of multimedia technology, more and more people share their lives by shooting videos and uploading videos. Since the contents of videos are diverse, and the audience scope of the videos is wide, the videos need to be rated, for example, the videos are rated into popular videos, restricted videos and adult videos, and therefore different ratings of videos are shown to different groups of people, and videos that are inappropriate for minors are prevented from being shown to minors.

In related technologies, the ratings of the videos are manually labeled by auditors. Specifically, video playback platforms have to be staffed by special auditors. The auditors need to watch each video uploaded on the video platforms. After watching any video, the auditors will mark the ratings of the videos based on their understanding of the plots of the videos.

The mode of manually marking the ratings of the videos is inefficient.

SUMMARY

The present disclosure provides a video rating method, a video rating device, equipment and a storage medium, and can overcome the problem of low efficiency in video rating.

According to the first aspect of the embodiments of the present disclosure, a video rating method is provided and includes: acquiring features of multiple modals of a video; fusing the features of the multiple modals to acquire a target feature; for each candidate rating of at least one candidate rating of the video, acquiring a matching degree between rating embedding of the candidate rating and the target feature, where the rating embedding is a vector representing the candidate rating; and selecting a candidate rating corresponding to rating embedding with a highest matching degree from the at least one candidate rating as a rating of the video according to the matching degree between each rating embedding and the target feature.

In a possible implementation manner, the acquiring a matching degree between the rating embedding of the candidate rating and the target feature includes: carrying out cross product on the rating embedding and the target feature to acquire a first result; inputting the first result to at least one first full connection layer to output a second result; and acquiring the matching degree according to the second result.

In a possible implementation manner, the acquiring the matching degree according to the second result includes any one of the following steps: carrying out cross product on the second result and the rating embedding to acquire a third result, inputting the third result to at least one second full connection layer, outputting a fourth result, and calculating the matching degree by taking the second result and the fourth result into an activation function; or calculating the matching degree by taking the second result into an activation function.

In a possible implementation manner, before acquiring the matching degree between the rating embedding of the candidate rating and the target feature, the method further includes: generating rating embedding of each candidate rating in the at least one candidate rating according to the sequential relationship of the at least one candidate rating, where the sequential relationship indicates an inappropriate degree of videos corresponding to the at least one candidate rating for target age groups.

In a possible implementation manner, the generating rating embedding of each candidate rating in the at least one candidate rating according to the sequential relationship of the at least one candidate rating includes: for an i-th candidate rating of the at least one candidate rating, generating a first vector according to i, where values of i dimensions in the first vector are first values, and the i is a positive integer; and generating rating embedding of the i-th candidate rating according to the first vector.

In a possible implementation manner, the first vector includes m dimensions, and values of first i dimensions among the m dimensions are the first values, values of the last (m-i) dimensions are second values, the m represents a total number of the at least one candidate rating, the m is a positive integer, and the m is greater than or equal to the i.

In a possible implementation manner, the generating the rating embedding of the i-th candidate rating according to the first vector includes: encoding values of respective dimensions in the first vector to acquire a second vector; and generating the rating embedding of the i-th candidate rating according to the second vector.

In a possible implementation manner, the generating the rating embedding of the i-th candidate rating according to the second vector includes: inputting the second vector to at least one third full connection layer to output the rating embedding of the i-th candidate rating.

In a possible implementation manner, the step of encoding the values of respective dimensions in the first vector to acquire the second vector includes: for each dimension of the respective dimensions in the first vector, carrying out one-hot encoding on a value of the each dimension to acquire a one-hot encoding value of the each dimension; and splicing one-hot encoding values of the respective dimensions to acquire the second vector.

In a possible implementation manner, the fusing the features of the multiple modals to acquire the target feature includes: for each modal of the multiple modals, inputting a feature of the modal to a first neural layer corresponding to the modal to output a hidden layer feature of the modal; and splicing hidden layer features of the multiple modals to acquire the target feature.

In a possible implementation manner, before inputting the feature of the modal to first neural layer corresponding to the modal and outputting hidden layer feature of the modal, the method further includes: acquiring the features of multiple modals of a sample video; for each modal of the multiple modals of the sample video, inputting a feature of the modal of the sample videos to a first neural layer corresponding to the modal, and outputting a hidden layer feature of the modal; splicing hidden layer features of the multiple modals of the sample video to acquire a target feature of the sample video; for each of the multiple modals of the sample video, inputting the target feature of the sample video into a second neural layer corresponding to the modal, and outputting a restored feature of the modal of the sample video; acquiring a loss value of the modal according to a difference between the restored feature of the modal of the sample video and the feature of the modal of the sample video; and adjusting parameters of first neural layers corresponding to the multiple modals according to loss values of the multiple modals.

According to a second aspect of the embodiments of the present disclosure, a video rating device is provided, and includes: an acquisition module configured to acquire features of multiple modals of a video; a feature fusion module configured to fuse the features of the multiple modals so as to acquire a target feature; the acquisition module further configured to acquire a matching degree between rating embedding of candidate rating and the target feature for each candidate rating of at least one candidate rating of the video, where the rating embedding is a vector representing the candidate rating; and a selection module configured to select a candidate rating corresponding to rating embedding with the highest matching degree from the at least one candidate rating as a rating of the video according to the matching degree between each rating embedding and the target feature.

In a possible implementation manner, the acquisition module specifically includes: a cross product submodule configured to carry out cross product on the rating embedding and the target feature to acquire a first result; an input submodule configured to input the first result into at least one first full connection layer and output a second result; and an acquisition submodule configured to acquire the matching degree according to the second result.

In a possible implementation manner, the acquisition submodule is configured to carry out cross product on the second result and the rating embedding to acquire a third result, input the third result to at least one second full connection layer to output a fourth result, calculate the matching degree by taking the second result and the fourth result into an activation function, or calculate the matching degree by taking the second result into the activation function.

In a possible implementation manner, the device further includes: a generating module configured to generate rating embedding of each candidate rating in the at least one candidate rating according to the sequential relationship of the at least one candidate rating, where the sequential relationship represents an inappropriate degree of videos corresponding to the at least one candidate rating for target age groups.

In a possible implementation manner, the generating module is configured to generate a first vector according to i for an i-th candidate rating of the at least one candidate rating, and generate rating embedding of the i-th candidate rating according to the first vector, where values of i dimensions in the first vector are first values, and the i is a positive integer.

In a possible implementation manner, the first vector includes m dimensions, and values of first i dimensions among the m dimensions are the first values, values of last (m-i) dimensions are second values, the m represents the total number of the at least one candidate rating, the m is a positive integer, and the m is greater than or equal to the i.

In a possible implementation manner, the generating module is configured to encode values of respective dimensions in the first vector to obtain a second vector, and generate the rating embedding of the i-th candidate rating according to the second vector.

In a possible implementation manner, the generating module is configured to input the second vector to at least one third full connection layer to output the rating embedding of the i-th candidate rating.

In a possible implementation manner, the generating module specifically includes: an encoding submodule configured to, for each dimension of respective dimensions in the first vector, carry out one-hot encoding on a value of the each dimension to acquire a one-hot encoding value of the each dimension; and a splicing submodule configured to splice one-hot encoding values of the respective dimensions to obtain the second vector.

In a possible implementation manner, the feature fusion module includes: an input submodule configured to, for each modal of the multiple modals, input a feature of the modal to a first neural layer corresponding to the modal to output a hidden layer feature of the modal; and a splicing submodule configured to splice hidden layer features of the multiple modals to obtain the target feature.

In a possible implementation manner, the acquisition module is further configured to acquire features of multiple modals of a sample video; the feature fusion module is further configured to, for each modal of the multiple modals of the sample video, input a feature of the modal of the sample video to a first neural layer corresponding to the modal to output a hidden layer feature of the modal, splice hidden layer features of the multiple modals of the sample video to acquire a target feature of the sample video, input the target feature of the sample video to a second neural layer corresponding to the modal for each modal of the multiple modals of the sample video, and to output a restored feature of the modal of the sample video; the acquisition module is further configured to acquire a loss value of the modal according to a difference between the restored feature of the modal of the sample video and the feature of the modal; and the device further includes an adjustment module configured to adjust parameters of first neural layers corresponding to the multiple modals according to loss values of the multiple modals.

According to a third aspect of the embodiments of the present disclosure, computer equipment is provided and includes one or more processors, and one or more memories configured to store instructions executed by the one or more processors, where the one or more processors are configured to execute the above video rating method.

According to a fourth aspect of the embodiments of the present disclosure, a non-transitory computer readable storage medium is provided, and instructions in the storage medium are executed by one or more processors of computer equipment to enable the computer equipment to execute the above video rating method.

According to a fifth aspect of the embodiments of the present disclosure, an application program is provided and includes one or more instructions, and when the one or more instructions are executed by the one or more processors of the computer equipment, the computer equipment is capable of executing the above video rating method.

BRIEF DESCRIPTION OF THE DRAWINGS

The drawings herein are incorporated in and constitute a part of the specification, illustrate the embodiments consistent with the present disclosure, and serve to explain the principles of the present disclosure together with the specification.

DETAILED DESCRIPTION OF THE EMBODIMENTS

Exemplary embodiments will be described in detail herein, and examples of the embodiments are illustrated in the accompanying drawings. When the following description refers to the accompanying drawings, same numbers in different drawings represent same or similar elements unless otherwise indicated. The implementations described in the following exemplary embodiments do not represent all implementations consistent with the present disclosure. On the contrary, they are merely examples of devices and methods consistent with certain aspects of the present disclosure as detailed in the appended claims.

The words such as "first", "second", and "nth" in terms such as "first vector" and "second vector", "first neural layers", "second neural layers", "third neural layers", "a first full connection layer", "a second full connection layer" and "a third full connection layer" in the present disclosure are used to distinguish same or similar items with basically same effects and functions. It should be understood that the "first", "second" and "nth" do not have a logical or temporal dependency relationship, nor do they limit the number and execution sequences.

Figure 1:
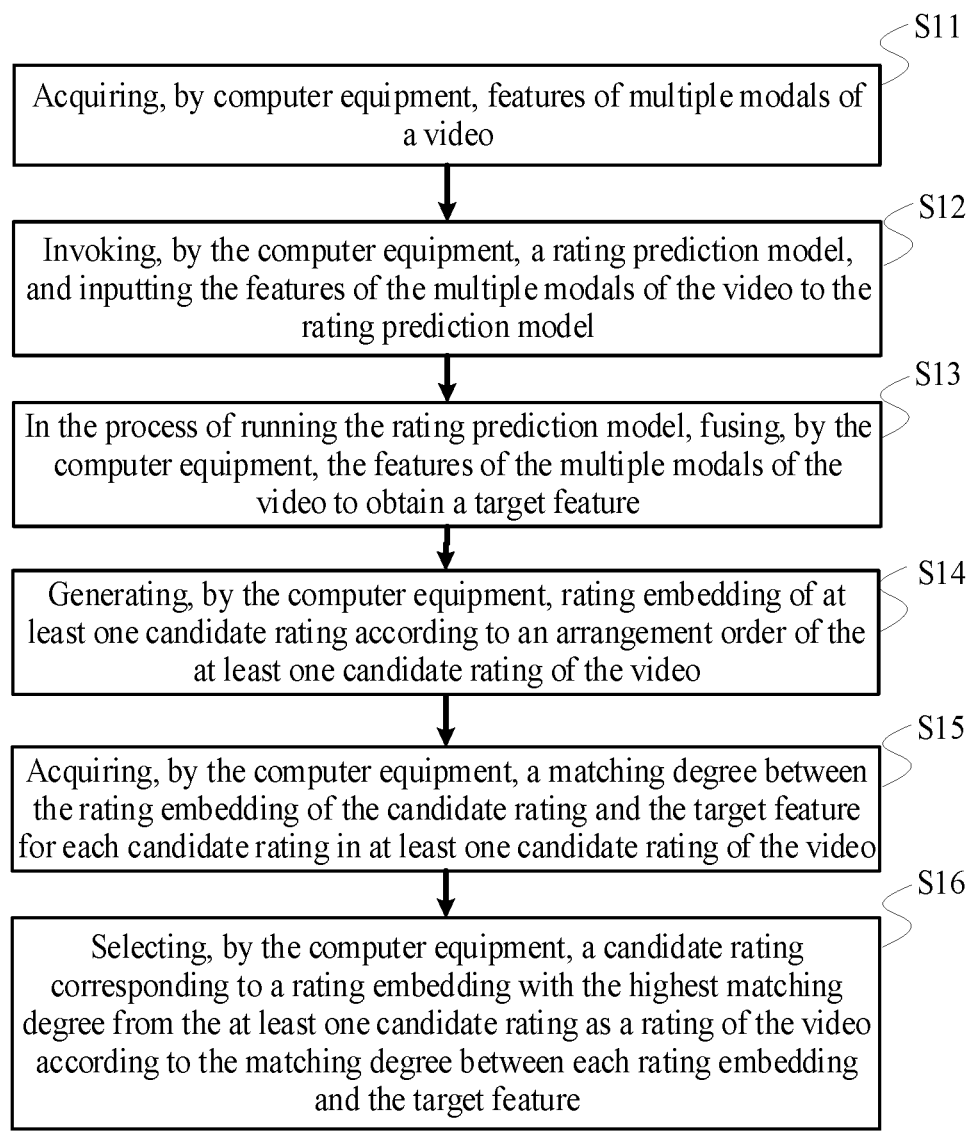
FIG. 1 is a flow chart of a video rating method according to an exemplary embodiment.

FIG. 1 is a flow chart of a video rating method according to an exemplary embodiment. As shown in FIG. 1, the method is adopted by computer equipment and includes the following steps.

S11, the computer equipment acquires features of multiple modals of a video.

The modals refer to sources or forms of data, and different modals of same data can describe the features of the data from different aspects. In the present embodiments, the modals of the video may include audios, texts, images, producers, semantics and so on.

In some possible embodiments, the video may be a short video, namely a video with the duration being shorter than a preset duration. The features of the multiple modals of the video include, but are not limited to, any two or a combination of two of an audio feature, a text feature, a video feature, an image feature, a producer feature and a semantic feature, where the feature of each modal can be a vector, such as a one-dimensional vector. A value of each dimension of the vector can be a normalized value, namely a value belonging to 0-1.

With regard to the manner of acquiring the features of the multiple modals, in some possible embodiments, for each modal of the content of the multiple modals, the computer equipment can acquire the content of the modal of the video, can input the content of the modal to a feature extraction model and output the feature of the modal. The feature extraction model is used for extracting the features of the video according to the content of the video, for example, the feature extraction model may be a convolutional neural network, or the feature extraction model may be an Inception network.

As an example, the audio of the video, the text of the video and the video can be acquired. The audio of the video is input to an audio feature extraction model, and an audio feature of the video is output; the text of the video is input to a text feature extraction model, and a text feature of the video is output; and the video is input to a video feature extraction model, and a video feature of the video is output. In this way, the three modal features of the audio feature, the text feature and the video feature can be acquired.

S12, the computer equipment invokes a rating prediction model, and inputs the features of the multiple modals of the video to the rating prediction model.

Figure 2:
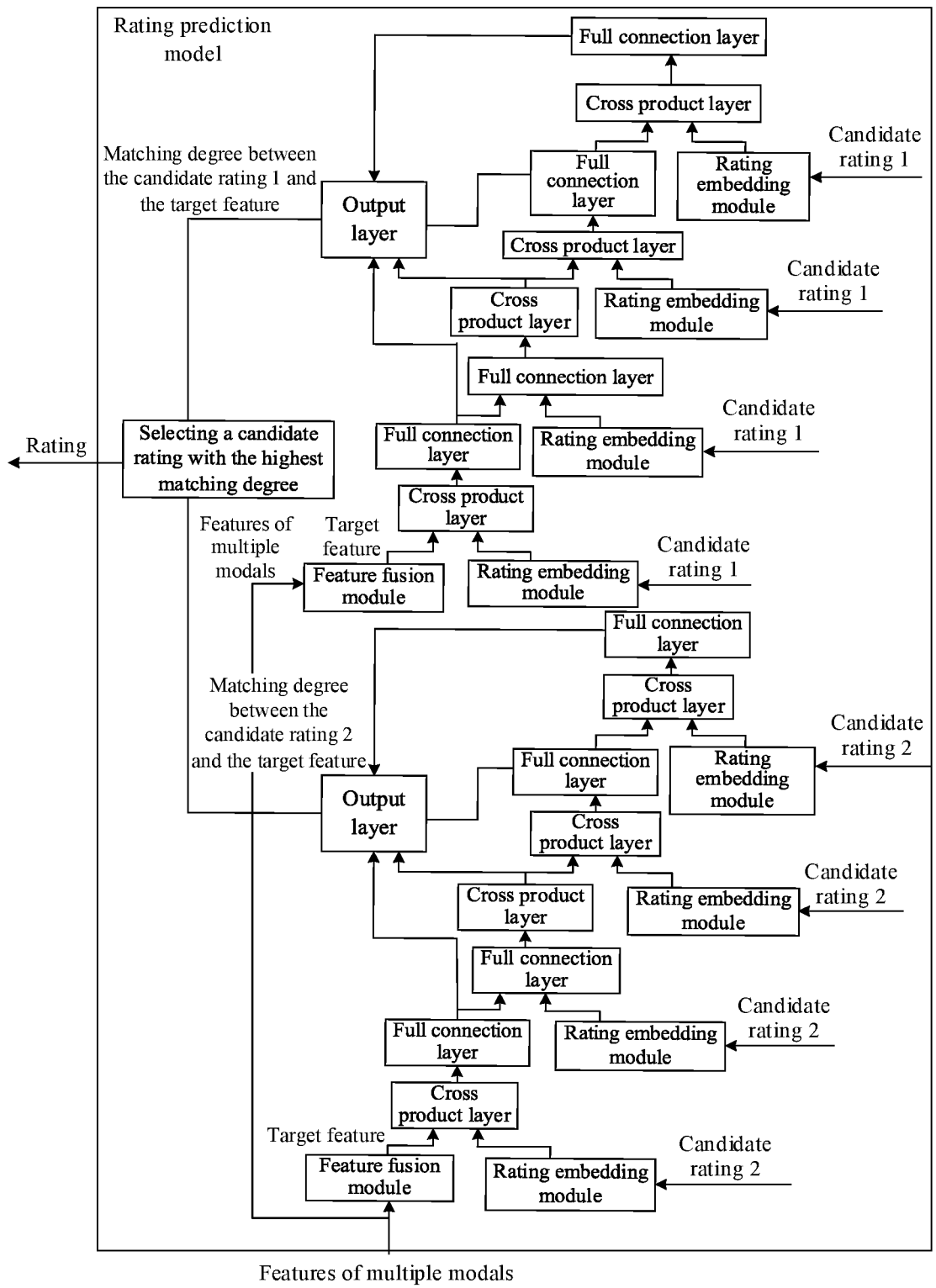
FIG. 2 is a structural schematic diagram of a video prediction model according to an exemplary embodiment.

The rating prediction model is used for predicting a rating of the video according to the features of the multiple modals of the video. The rating prediction model can be obtained according to features of multiple modals of a sample video and rating labels of the sample video. A structure of the rating prediction model may be as shown in FIG. 2. The rating prediction model may include a feature fusion module, a rating embedding module, a cross product layer, full connection layers, an output layer and other parts. The feature fusion module is configured to perform the following S13, the rating embedding module is configured to perform the following S14, and the cross product layer, the full connection layers and the output layer are configured to perform the following S15. The computer equipment may perform the following S13 to S16 in the process of running the rating prediction model.

S13, the computer equipment fuses the features of the multiple modals of the video to obtain a target feature in the process of running the rating prediction model.

The target feature is obtained by fusing the features of the multiple modals. The target feature may also be called a combined feature or a fusion feature or be called differently based on business needs. The target feature may be in a vector form.

Regarding the manner of feature fusion, in some possible embodiments, in a rating prediction process, the rating prediction model may include an encoder in an auto encoder network, and the computer equipment may input the features of the multiple modals of the video to the encoder in the auto encoder network and output the target feature.

The auto encoder network is an automatic encoder which is an unsupervised neural network. The auto encoder network may include an encoder and a decoder. The encoder is configured to extract features from input data. The decoder is configured to restore the input data according to the extracted features. The auto encoder network can be trained according to the features of the multiple modals of the sample video. The auto encoder network can learn distribution and features of implicit information in the features of the multiple modals according to the features of the multiple modals of the sample video. The auto encoder network may include multiple neural layers. Each neural layer is also called an implicit layer or a hidden layer. Each neural layer includes at least one neuron. Each neuron is configured to perform linear mapping and non-linear mapping on the input data so as to acquire output data.

Figure 3:
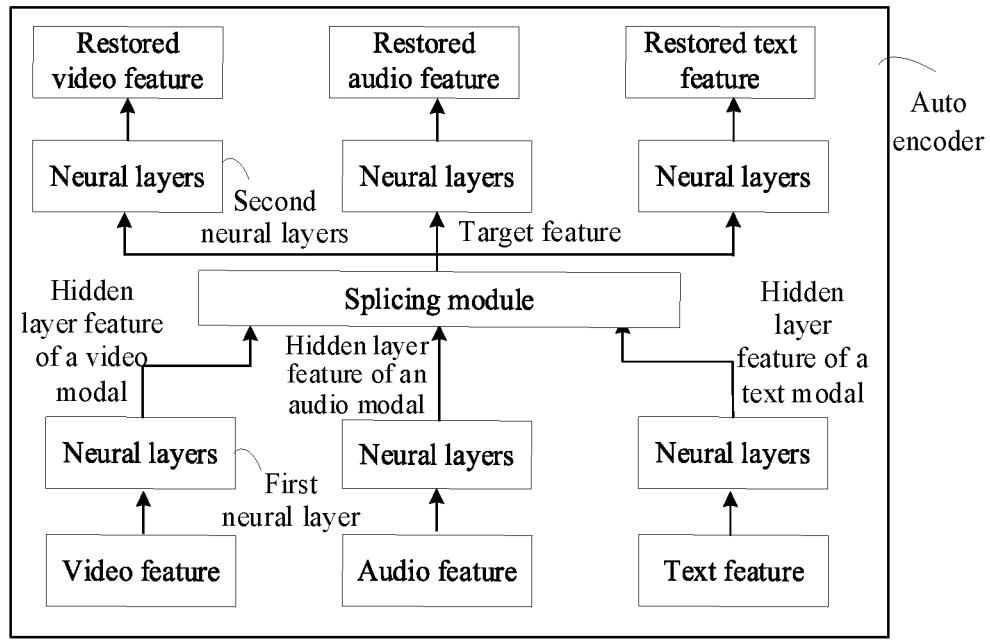
FIG. 3 is a structural schematic diagram of an auto-encoder according to an exemplary embodiment.
Figure 4:
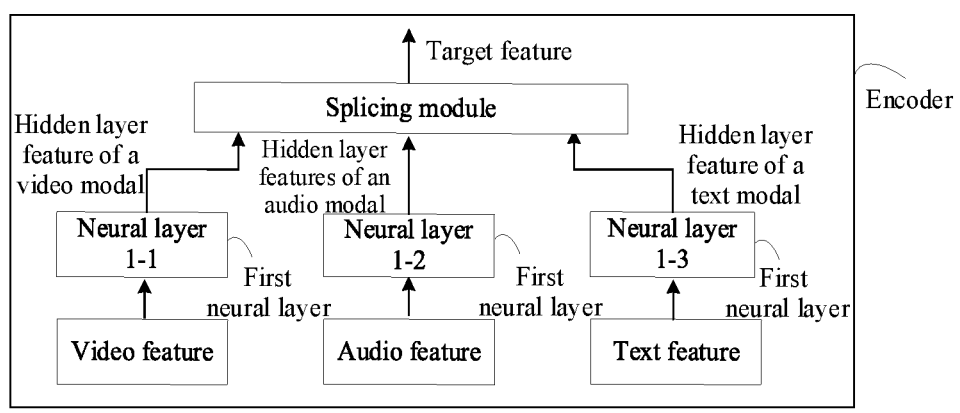
FIG. 4 is a structural schematic diagram of an encoder according to an exemplary embodiment.
Figure 5:
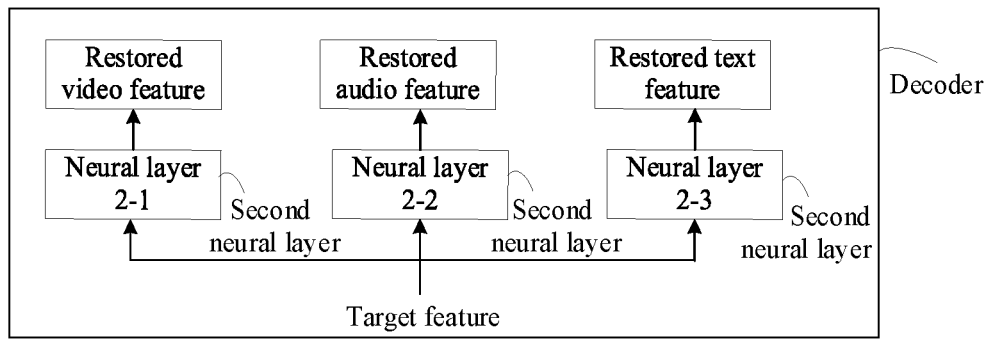
FIG. 5 is a structural schematic diagram of a decoder according to an exemplary embodiment.

Exemplarily, FIG. 3 shows a structural schematic diagram of the auto encoder network. The auto encoder network may include the encoder and the decoder. FIG. 4 shows a structural schematic diagram of the encoder in the auto encoder network. FIG. 5 shows a structural schematic diagram of the decoder in the auto encoder network. In order to distinguish the description, neural layers of the encoder in the auto encoder network are referred to as first neural layers, and neural layers of the decoder in the auto encoder network are referred to as second neural layers.

As shown in FIG. 4, the multiple first neural layers may correspond to the multiple modals in a one-to-one mode, and each first neural layer is configured to acquire a hidden layer feature of a corresponding modal according to a feature of the corresponding modal. As shown in FIG. 5, the multiple second neural layers may correspond to the multiple modals in a one-to-one mode, and each second neural layer is configured to restore a feature of a corresponding modal according to a target feature.

In some possible embodiments, the step of inputting the features of the multiple modals of the video to the encoder and outputting the target feature may include the following steps (1)-(2).

Step (1): for each of the multiple modals, inputting a feature of the modal to a first neural layer corresponding to the modal, and outputting a hidden layer feature of the modal.

Specifically, the first neural layers may include a first neural layer corresponding to a video modal, a first neural layer corresponding to an audio modal, and a first neural layer corresponding to a text modal. The video feature may be input to the first neural layer corresponding to the video modal, and the hidden layer feature of the video modal is output; the audio feature is input to the first neural layer corresponding to the audio modal, and the hidden layer feature of the audio modal is output; and the text feature is input in the first neural layer corresponding to the text modal, and the hidden layer feature of the text modal is output.

Exemplarily, referring to FIG. 5, the encoder of the auto encoder network includes a neural layer 1-1, a neural layer 1-2 and a neural layer 1-3. The video feature can be input to the neural layer 1-1, and the neural layer 1-1 can output the hidden layer feature of the video feature; the audio feature is input to the neural layer 1-2, the neural layer 1-2 can output the hidden feature of the audio feature; and the text feature is input to the neural layer 1-3, and the neural layer 1-3 can output the hidden layer feature of the text feature.

Step (2): splicing hidden layer features of the multiple modals to obtain the target feature.

The target feature may include the hidden layer features of the multiple modals. The manner of splicing the hidden layer features of the multiple modals may include: successively splicing the hidden layer features of the multiple modals end to end to obtain the target feature. For example, if the hidden layer features of the multiple modals are: a hidden layer feature 1 of the video modal, where the hidden layer feature 1 is a vector with m1 dimensions; a hidden layer feature 2 of the audio modal, where the hidden layer feature 2 is a vector with m2 dimensions; and a hidden layer feature 3 of the text modal, where the hidden layer feature 3 is a vector with m3 dimensions; and after the hidden layer features of the three modals are spliced, the obtained target feature is a vector with (m1+m2+m3) dimensions, the first m1 dimensions represent the hidden layer feature 1, the middle m2 dimensions represent the hidden layer feature 2, the last m3 dimensions represent the hidden layer feature 3, where m1, m2 and m3 are positive integers.

In some possible embodiments, the encoder may include a splicing module. The splicing module may be one or more neural layers, and the hidden layer features of the multiple modals may be spliced in the one or more neural layers. Exemplarily, referring to FIG. 4, the hidden layer features of the three modals output by the neural layer 1-1, the neural layer 1-2 and the neural layer 1-3 can be spliced in the splicing module to obtain the target feature.

By fusing the features of the multiple modals, the target feature obtained after fusion can take advantage of the complementarity between the features of different modals, eliminate the redundancy between the features of different modals, and learn better feature representation, so that the prediction accuracy can be improved by predicting the rating of the video through the fused target feature.

S14, the computer equipment generates rating embedding of at least one candidate rating according to an arrangement order of the at least one candidate rating of the video.

In the embodiment, videos can be divided into different candidate ratings according to the videos with different contents, and a rating prediction model is adopted for predicting the candidate ratings of which the videos belong to. If the videos can be divided into 5 ratings in total, and rating values range from 1, 2, 3, 4 and 5, at least one candidate rating is 1, 2, 3, 4 and 5.

At least one candidate rating of the videos may have an arrangement order, and the computer equipment may generate rating embedding of the at least one candidate rating according to the arrangement order of the at least one candidate rating, where the arrangement order of the at least one candidate rating represents an inappropriate degree of videos in the at least one candidate rating for target age groups. As an example, if a candidate rating is ranked lower in at least one candidate rating, the target age groups are less likely to watch the videos in the candidate rating, where the target age groups may be children, minors and the like. For example, rating 1 can be a general rating, that is, videos in the rating 1 can be watched by everyone; rating 2 can be a guidance rating, that is, part of contents of videos in the rating 2 may not be appropriate for children to watch; rating 3 can be a special guidance rating, that is, videos in the rating 3 are recommended for children over the age of 13; rating 4 can be a restricted rating, that is, videos in the rating 4 are recommended for people over the age of 17; and rating 5 can be a restricted rating, that is, people under the age of 17 (including 17) are not allowed to watch videos in the rating 5.

Embedding refers to mapping information from a high-dimensional space to a vector space, and each value of the information is mapped to a vector in the vector space. In the embodiment, rating embedding is a vector representing the candidate rating. Specifically, the at least one candidate rating may be represented in a distributed manner based on the neural network according to the arrangement order of the at least one candidate rating, so as to obtain the rating embedding of the at least one candidate rating.

As an example, a generation process of the rating embedding may include the following steps 1-2.

Step 1: the computer equipment generates a first vector according to i for an i-th candidate rating in at least one candidate rating, where i is a positive integer.

Specifically, values of i dimensions in the first vector may be first values, and the first values may be any preset value, for example, may be 1. As an example, if at least one candidate rating is 1, 2, 3, 4 and 5, for a second candidate rating, namely the rating 2, values of two dimensions of the first vector may be 1; and for a third candidate rating, namely the rating 3, values of three dimensions of the first vector may be 1.

In some possible embodiments, the first vector may include m dimensions, values of the first i dimensions among the m dimensions are the first values, and values of the last (m-i) dimensions are second values, where m is the total number of at least one candidate rating, the second values are different from the first values, the second values may be 0, and the first vector may be a binary value, that is, the value of each dimension is the first value or the second value. As an example, if at least one candidate rating is 1, 2, 3, 4 and 5, the first vector may include 5 dimensions. For the second candidate rating 2, the values of the first 2 dimensions of the first vector of the candidate rating 2 are 1, and the values of the last 3 dimensions are 0, so that the first vector of the candidate rating 2 is (1, 1, 0, 0, 0).

Step 2: the computer equipment generates rating embedding of the candidate rating according to the first vector.

Step 2 may specifically include the following steps (2.1)-(2.2).

Step (2.1): the computer equipment encodes the value of at least one dimension in the first vector to obtain a second vector.

In some possible embodiments, for each dimension in at least one dimension in the first vector, a value of the dimension can be subjected to one-hot encoding to obtain one-hot encoding value of the dimension; and one-hot encoding values of the at least one dimension can be spliced to obtain the second vector, where the second vector includes the one-hot encoding values of the values of the dimensions in the first vector, and one-hot encoding is valid one-bit encoding, that is, only one bit of the one-hot encoding value is valid, and the remaining bits are invalid.

For example, if the value of each dimension in the first vector is binarized, and the value of each dimension is 1 or 0, one-hot encoding is carried out on 1, the obtained one-hot encoding value of 1 is (0, 1), one-hot encoding is carried out on 0, the obtained one-hot encoding value of 0 is (1, 0), then the total number of the dimensions of the second vector may be twice the total number of the dimensions of the first vector, and the value of any one dimension in the first vector can be mapped to the values of two dimensions in the second vector. For example, if the first vector is (1, 1, 0, 0, 0) and the value of the first dimension of the first vector is 1, the value of the first dimension and the value of the second dimension in the second vector are one-hot encoding values of 1, namely (0, 1); the value of the second dimension of the first vector is 1, and the values of the third and fourth dimensions in the second vector are also one-hot encoding value of 1, namely (0, 1); the value of the third dimension of the first vector is 0, and the values of the fifth and sixth dimensions in the second vector are one-hot encoding value of 0, namely (1, 0), and so on, the second vector includes 10 dimensions in total, namely the second vector is (0, 1, 0, 1, 1, 0, 1, 0, 1, 0).

It should be noted that one-hot encoding is only an example of an encoding mode. In other possible embodiments, encoding modes other than the one-hot encoding mode may also be adopted for encoding values of the dimensions of the first vector, which is not limited herein.

Step (2.2): the computer equipment generates rating embedding of the candidate rating according to the second vector.

In some possible embodiments, the second vector may be input to at least one third full connection layer, and the rating embedding of the candidate rating may be output. The third full connection layer is used for generating rating embedding according to the second vector, and the third full connection layer can be obtained according to a model training process performed in advance. The number of at least one third full connection layer can be set according to experience, requirements or experiments, which is not limited herein.

Figure 6:
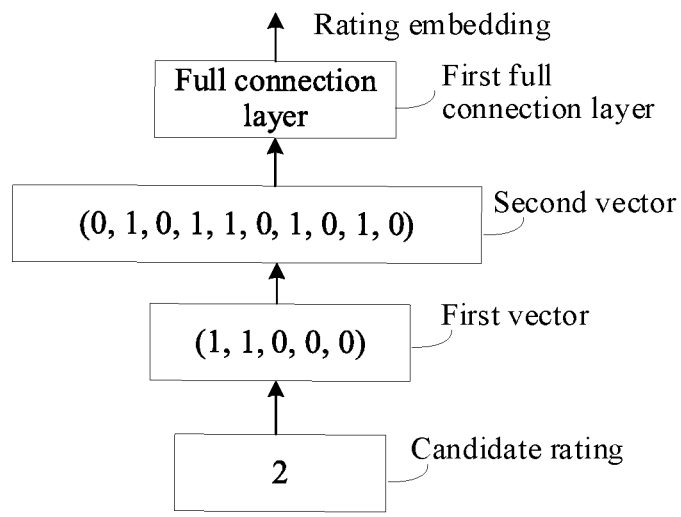
FIG. 6 is a workflow chart of a rated rating embedding module according to an exemplary embodiment.

The function of the above S14 may be realized by a rated rating embedding module. By taking the conversion of the candidate rating 2 into the rating embedding as an example, FIG. 6 shows a workflow chart of the rated rating embedding module is shown.

S15, for each candidate rating in at least one candidate rating of the video, the computer equipment acquires the matching degree between the rating embedding of the candidate rating and the target feature.

In some possible embodiments, the matching degree may be recorded as a score, that is, the rating embedding is scored according to the matching degree between the rating embedding and the target feature. Specifically, if there are n rating embedding, the matching degree corresponding to each rating embedding in the n rating embedding can be acquired correspondingly, so that n matching degrees are acquired, where n is a positive integer.

In some possible embodiments, the acquiring process of the matching degree may include the following steps 1-3.

Step 1: the computer equipment carries out cross product on the rating embedding and the target feature to obtain a first result.

The first result refers to a result obtained by cross product of the target feature and the rating embedding. Specifically, the following formula (1) can be adopted for calculating the target feature and the rating embedding to obtain the first result.

$$\text{Cross}_{(i-1)*n+j} = F_i * R_j \qquad (1).$$

Where F represents the target feature, R represents the rating embedding, Cross represents the first result, i represents an index of any dimension in the target feature, i belongs to {1, 2, . . . n}, and n represents the total number of dimensions of the target feature, j represents an index of any dimension in the rating embedding, j belongs to {1, 2, . . . m}, m represents the total number of dimensions of the rating embedding, and n and m are positive integers.

Step 2: the computer equipment inputs the first result to at least one first full connection layer, to output a second result.

The second result refers to a result obtained by making the first result pass through the at least one full connection layer. The first full connection layer is configured to obtain the second result according to the first result, and the number of the first full connection layer can be set according to experiments, experience or requirements.

Step 3: the computer equipment acquires the matching degree according to the second result.

Figure 7:
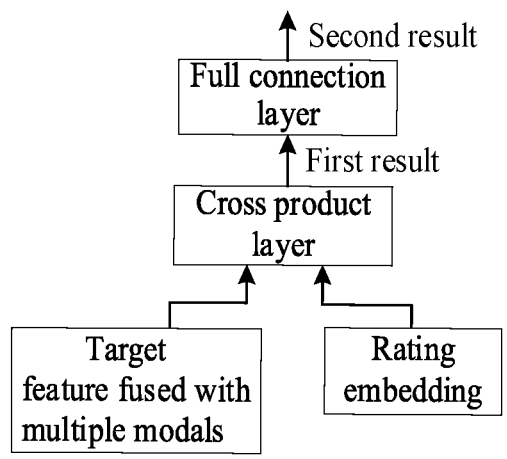
FIG. 7 is a flow chart of a basic process executed for the first time according to an exemplary embodiment.
Figure 8:
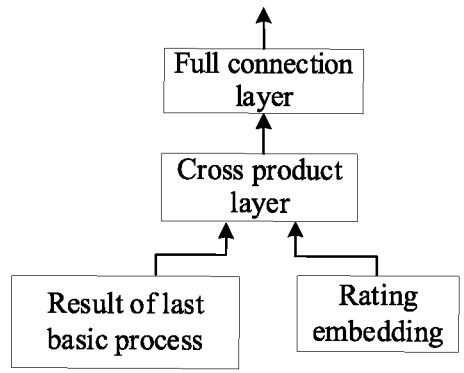
FIG. 8 is a flow chart from a basic process executed for the second time to a basic process executed for the last time according to an exemplary embodiment.

In some possible embodiments, an iterative mode may be adopted, cross product operation and full connection operation are adopted as a basic process, and by repeatedly performing the basic process several times, the matching degree is acquired according to the results of performing the basic process several times. The difference between the basic processes executed at different times is that in the process of the cross product operation, data subjected to cross product with the rating embedding are different, in the basic process executed for the first time, cross product is carried out on the target feature and the rating embedding; and from the basic process executed for the second time to the basic process executed for the last time, cross product is carried out on the result of the basic process executed for the previous time and the rating embedding, where the basic process executed for the first time includes the above step 1 and step 2. Exemplarily, referring to FIG. 7 and FIG. 8, FIG. 7 shows a flow chart of the basic process executed for the first time, and FIG. 8 shows a flow chart from the basic process executed for the second time to the basic process executed for the last time.

By taking the execution of the basic process twice as an example, referring to FIG. 2, after the above step 1 and step 2 are executed, the second result and the rating embedding are subjected to cross product to obtain a third result which refers to a result obtained by cross product of the second result and the rating embedding, and the rating embedding adopted for obtaining the third result is the same as the rating embedding adopted for obtaining the first result; the third result is input to at least one second full connection layer to output a fourth result; after performing the basic process twice, the method may include: calculating the second result and the fourth result with an activation function to obtain the matching degree.

By taking the execution of the basic process three times as an example, referring to FIG. 2, after executing the basic process for the first time and the basic process for the second time, the method may include: carrying out cross product on the fourth result and the rating embedding to obtain a fifth result, and inputting the fifth result to at least one fourth full connection layer to output a sixth result; and after executing the basic process three times, the method may include: calculating the second result, the fourth result and the sixth result with an activation function to obtain the matching degree.

It should be noted that the above description only takes examples of executing the basic process twice or three times, in some possible embodiments, the basic process may be executed four or more times, and the execution times of the basic process can be set based on experiments, experience or requirements, which is not limited herein.

Through the above implementation mode, in the rating prediction process, the rating prediction model can use the rating embedding as much as possible by repeatedly executing the basic process, so that the weight of the rating embedding in the rating prediction model is increased, and the rating prediction accuracy and reliability of the rating prediction model can be effectively improved.

It should be noted that the mode of repeatedly executing the basic process is only an exemplary embodiment, and is not intended to limit the scope of the present application. In other possible embodiments, after the basic process is executed once, the second result is calculated with an activation function to obtain the matching degree.

It should be noted that the embodiment is described by taking S14 executed during rating prediction as an example. In other possible embodiments, before rating prediction, S14 may be performed in advance for storing the obtained the rating embedding, the prestored rating embedding can be directly read in the rating embedding process. Exemplarily, the candidate rating may be used as an input parameter of the rating prediction model, and S14 is performed in the process of running the rating prediction model. Alternatively, S14 may be performed in an offline training process, the obtained rating embedding is built in the rating prediction model, and the timing for generating the rating embedding is not specifically limited in the embodiment.

S16, the computer equipment selects a candidate rating corresponding to a rating embedding with the highest matching degree from the at least one candidate rating as the rating of the video according to the matching degree between each rating embedding and the target feature.

By performing the above step S15, the matching degree corresponding to each rating embedding in at least one rating embedding can be acquired through the computer equipment. For any rating embedding, if the corresponding matching degree of the rating embedding is higher, it indicates that the rating embedding best matches the target feature fused with multiple modals, and therefore the candidate rating corresponding to the rating embedding is more likely to be the accurate rating of the video. Thus, at least one rating embedding can be sorted according to the order of the matching degrees from high to low, the first rating embedding is selected, and the candidate rating corresponding to the rating embedding is used as the rating of the video.

In some possible embodiments, the rating of the video may be an output result of the rating prediction model, after the rating of the video is selected, the rating prediction model may output the rating of the video in order to feed back the rating of the video to users, for example, the rating of the video can be visualized, or the rating of the video can be displayed in a graphical user interface.

It should be noted that the embodiment is only described by taking a video rating scene as an example, and in some possible embodiments, the embodiment can also be applied to a scene of rating other objects other than videos. In addition, besides the scene of rating, for other ordinal regression scenes, namely scenes that a certain order exists between different values in a value range of a predicted rating, the above-mentioned rating embedding method can be adopted for predicting the rating of the object.

The embodiment provides a method for automatically rating a video based on features of multiple modals of the video and modes of rating embedding. By fusing the features of the multiple modals of the video, the rating of the video is converted into rating embedding in the vector space, and the matching degree between the target feature of the multiple modals and each rating embedding is obtained, the rating of the video is predicted according to the matching degree corresponding to each rating embedding, and the video rating efficiency and accuracy can be improved.

The training process of the rating prediction model provided by the above embodiments is exemplarily described below.

Step 1: the computer equipment acquires sample features of multiple modals of a sample video, and rating labels of the sample video.

The rating labels may be ratings manually labeled by developers. By adopting the rating labels for model training, the model can be assisted in learning the mapping relationship between the features and the ratings through experience of the developers.

Step 2: the computer equipment invokes the rating prediction model, and inputs the sample features of the multiple modals and the rating labels to the rating prediction model.

Step 3: in the process of running the rating prediction model, the computer equipment fuses the sample features of the multiple modals of the sample video to obtain sample target features.

In some possible embodiments, during model training, the rating prediction model may include an auto encoder network, the computer equipment can train the encoder network through the features of the multiple modals of the sample video in an unsupervised mode according to the difference between the features of the sample video restored by the encoder network and the input features of the sample video, so that the encoder in the encoder network learns the ability of extracting features, and the encoder can be used for feature fusion in the above S13.

Specifically, step 3 may include the following steps (3.1)-(3.4).

Step (3.1): for each of the multiple modals, the computer equipment inputs a feature of the modal of the sample video to the first neural layer corresponding to the modal, and outputs a hidden layer feature of the modal.

Step (3.2): the computer equipment splices hidden layer features of the multiple modals to obtain target features.

Step (3.3): for each of the multiple modals, the computer equipment inputs the target feature of the modal to a second neural layer corresponding to the modal, and outputs a restored feature of the modal.

The restored feature refers to a feature obtained by restoring the feature according to the target feature. Specifically, the second neural layers may include a second neural layer corresponding to a video modal, a second neural layer corresponding to an audio modal, and a second neural layer corresponding to a text modal. The second neural layer corresponding to the video modal is used for restoring video features according to the target feature, the second neural layer corresponding to the audio modal is used for restoring audio features according to the target feature, and the second neural layer corresponding to the text modal is used for restoring text features according to the target feature. The target feature can be input to the second neural layer corresponding to the video modal, and a restored video feature can be output; the target feature can be input to the second neural layer corresponding to the audio modal, and a restored audio feature can be output; and the target feature can be input to the second neural layer corresponding to the text modal, and a restored text feature is output.

For example, referring to FIG. 5, the decoder includes a neural layer 2-1, a neural layer 2-2 and a neural layer 2-3. The target feature can be input to the neural layer 2-1, and the neural layer 2-1 can output the restored video feature; the target feature can be input to the neural layer 2-2, and the neural layer 2-2 can output the restored audio feature; and the target feature can be input to the neural layer 2-3, and the neural layer 2-3 can output the restored text feature.

Step (3.4): the computer equipment acquires loss values of the multiple modals according to the sample features of the multiple modals of the video and the restored sample features of the multiple modals of the video.

For each modal of the multiple modals, a loss value of the modal can be obtained based on the difference between the feature of the modal of the sample video and the restored feature of the modal. The loss value represents the differences between the feature of the corresponding modal of the sample video and the restored feature of the corresponding modal. The larger the loss value, the greater the difference between the feature of the corresponding modal and the restored feature of the corresponding modal, and the less accurate the encoder and/or the decoder of the corresponding modals is. By adjusting the parameters of the models through the loss values of the multiple modals, the loss values of the models can be gradually reduced, and thus the parameters of the models are optimized.

In some possible embodiments, for any one of the multiple modals, a first loss function may be adopted for calculating the feature of the modal of the sample video and the restored feature of the modal to obtain the loss value of the modal, where the first loss function includes, but is not limited to, a cross entropy loss function, a KL divergence (Kullback-Leibler Divergence, also called relative entropy) and the like.

Exemplarily, an image feature and a restored image feature can be calculated according to the following formula (2) to obtain a loss value of an image modal. An audio feature and a restored video feature are calculated according to the following formula (3) to obtain a loss value of an audio modal. A text feature and a restored text feature are calculated according to the following formula (4) to obtain a loss value of a text modal.

$$Loss_{image}=KL(image_i^{output}, image_i^{input}) \quad (2).$$

$$Loss_{audio}=KL(audio_i^{output}, audio_i^{input}) \quad (3).$$

$$Loss_{text}=KL(text_i^{output}, text_i^{input}) \quad (4).$$

Where, $Loss_{image}$ represents a loss value of an image modal, KL means solution of a KL divergence, $image_i^{input}$ represents an image feature, $image_i^{input}$ represents a restored image feature, $Loss_{audio}$ represents a loss value of an audio modal, $audio_i^{input}$ represents an audio feature, $audio_i^{output}$ represents a restored audio feature, $Loss_{text}$ represents the loss value of the text modal, $text_i^{input}$ represents the text feature, and $text_i^{output}$ represents the restored text feature.

In this way, the loss value of the image modal, the loss value of the audio modal and the loss value of the text modal can be obtained, and the loss values of the three modal can be used as a part of the overall loss function to be subsequently used for joint optimization of the rating prediction model.

Step 4: the computer equipment acquires a matching degree between the rating embedding of the candidate rating and the sample target feature for each candidate rating in at least one candidate rating of the sample video.

By taking the twice execution of a basic process in which cross product operation and full connection operation are executed once as an example, step 4 may include steps (4.1)-(4.6).

Step (4.1): for each candidate rating in at least one candidate rating of the sample video, the computer equipment carries out cross product on the target feature of the sample video and the rating embedding of the candidate rating to obtain a first result.

Step (4.2): the computer equipment inputs the first result to at least one first full connection layer to output a second result.

Step (4.3): the computer equipment acquires a matching degree between the target feature and the candidate rating according to the second result.

Step (4.4): the computer equipment carries out cross product on the second result and the rating embedding to acquire a third result.

Step (4.5): the computer equipment inputs the third result to at least one second full connection layer to output a fourth result.

Step (4.6) the computer equipment adopts an activation function to calculate the second result and the fourth result to obtain the matching degree.

Step 5: the computer equipment selects a candidate rating corresponding to rating embedding with the highest matching degree from the at least one candidate rating as the rating of the sample video according to the matching degree between each rating embedding and the target feature of the sample video.

Step 6: the computer equipment adjusts the parameters of the rating prediction model according to the difference between the rating of the sample video and the rating label of the sample video.

In some possible embodiments, a second loss function can be adopted for calculating the rating and the rating label to obtain a rating loss value; the sum value of the rating loss value and the loss values of the multiple modals acquired in step 3 is obtained, the sum value is regarded as a loss value of the rating prediction model, and the parameters of any one or more of layers in the rating prediction model are adjusted according to the loss value of the rating prediction model. Specifically, the parameters of the first neural layers corresponding to the multiple modals may be adjusted according to the loss value; in addition, any one or more of parameters of at least one first full connection layer, at least one second full connection layer and at least one third full connection layer may be adjusted. Of course, if the rating prediction model includes other layers, the parameters of other layers can be adjusted in the same way, where after once adjustment, adjustment is stopped after the above steps 1-6 are repeatedly performed until the loss value is lower than a loss value threshold, and thus the rating prediction model is obtained.

Exemplarily, a rating loss function may be a squared loss function or an absolute value loss function. Taking the squared loss function as an example, the image feature and the restored image feature may be calculated according to the following formula (5) to obtain the loss value of the image modal.

$$\text{Loss} = \Sigma_i (r_i' - r_i)^2 + \text{Loss}_{image} + \text{Loss}_{audio} + \text{Loss}_{text} \quad (5).$$

Where Loss represents a loss value of a rating prediction model, $r_i'$ represents a predicted rating, r represents a rating label, $\text{Loss}_{image}$ represents a loss value of an image modal, $\text{Loss}_{audio}$ represents a loss value of an audio modal, and $\text{Loss}_{text}$ represents a loss value of a text modal.

Figure 9:
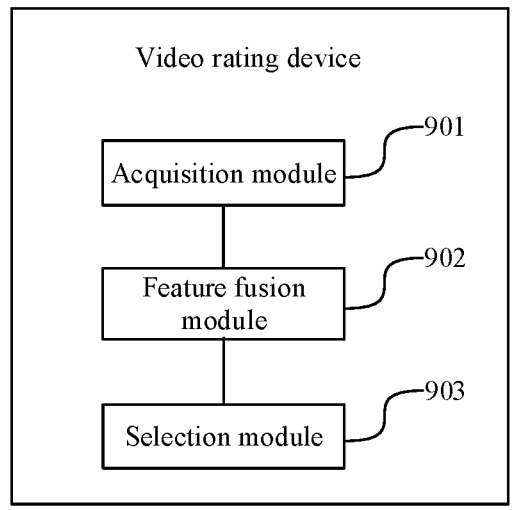
FIG. 9 is a block diagram of a video rating device according to an exemplary embodiment.

FIG. 9 is a block diagram of a video rating device according to an exemplary embodiment. Referring to FIG. 2, the device includes an acquisition module 901, a feature fusion module 902 and a selection module 903.

The acquisition module 901 is configured to acquire features of multiple modals of a video.

The feature fusion module 902 is configured to fuse the features of the multiple modals so as to acquire a target feature.

The acquisition module 901 is further configured to acquire a matching degree between rating embedding of the candidate rating and the target feature for each candidate rating of at least one candidate rating of the video, and the rating embedding is a vector representing the candidate rating.

The selection module 903 is configured to select the candidate rating corresponding to the rating embedding with the highest matching degree from the at least one candidate rating as the rating of the video according to the matching degree between each rating embedding and the target feature.

The embodiment provides a device for automatically rating the video based on the features of the multiple modals of the video and the mode of rating embedding. By fusing the features of the multiple modals of the video, the ratings of the video are converted into rating embedding in vector spaces, the matching degrees between the target feature of the multiple modals and all the rating embedding are acquired, and the rating of the video is predicted according to the matching degree corresponding to each rating embedding, so that the video rating efficiency and accuracy can be improved.

In a possible implementation manner, the acquisition module 901 specifically includes: a cross product submodule configured to carry out cross product on the rating embedding and the target feature to acquire a first result; an input submodule configured to input the first result to at least one first full connection layer to output a second result; and an acquisition submodule configured to acquire the matching degree according to the second result.

In a possible implementation manner, the acquisition submodule is configured to carry out cross product on the second result and the rating embedding to acquire a third result, input the third result to at least one second full connection layer to output a fourth result, calculate the second result and the fourth result with an activation function to acquire the matching degree; or calculate the second result with the activation function to acquire the matching degree.

In a possible implementation manner, the device further includes: a generating module configured to generate rating embedding of each candidate rating in the at least one candidate rating according to the sequential relationship of the at least one candidate rating, where the sequential relationship represents the inappropriate degree of videos in the at least one candidate rating for target age groups.

In a possible implementation manner, the generating module is configured to generate a first vector according to i for an i-th candidate rating of the at least one candidate rating, where values of i dimensions in the first vector are first values, and i is a positive integer; and the generating module is configured to generate rating embedding of the i-th candidate rating according to the first vector.

In a possible implementation manner, the first vector includes m dimensions, and values of the first i dimensions among the m dimensions are first values, values of the last (m-i) dimensions are second values, the m represents the total number of the at least one candidate rating, the m is a positive integer, and is greater than or equal to the i.

In a possible implementation manner, the generating module is configured to encode a value of at least one dimension in the first vector to obtain a second vector, and generate rating embedding of the i-th candidate rating according to the second vector.

In a possible implementation manner, the generating module is configured to input the second vector to at least one third full connection layer to output the rating embedding of the i-th candidate rating.

In a possible implementation manner, the generating module specifically includes: an encoding submodule configured to carry out one-hot encoding on the values of dimensions in at least one dimension in the first vector to acquire one-hot encoding values of the dimensions; and a splicing submodule configured to splice the one-hot encoding values of the dimensions to obtain the second vector.

In a possible implementation manner, the feature fusion module 902 specifically includes: an input submodule configured to input the features of the modals to first neural layers corresponding to the modals for each modal of the multiple modals and output hidden layer features of the modals; and a splicing submodule configured to splice the hidden layer features of the multiple modals to obtain the target feature.

In a possible implementation manner, the acquisition module 901 is further configured to acquire features of multiple modals of a sample video.

The feature fusion module 902 is further configured to input the features of the modals of the sample video to first neural layers corresponding to the modals for each modal of the multiple modals to output hidden layer features of the modals, splice the hidden layer features of the multiple modals to acquire the target feature of the sample video, input the target feature of the sample video to second neural layers corresponding to the modals for each modal of the multiple modals to output restored features of the modals of the sample videos.

The acquisition module 901 is further configured to acquire loss values of the modals according to differences between the restored features of the modals of the sample video and the features of the modals.

The device further includes an adjustment module configured to adjust parameters of the first neural layers corresponding to the multiple modals according to the loss values of the multiple modals.

Regarding the device in the above embodiments, the specific operation execution modes of the modules have been described in detail in the embodiments of the method, and will not be described in detail herein.

Figure 10:
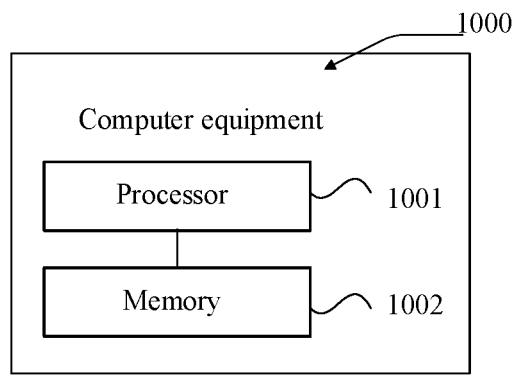
FIG. 10 is a structural schematic diagram of computer equipment according to an exemplary embodiment.

FIG. 10 is a structural schematic diagram of a server according to an exemplary embodiment. The server 1000 may have a large difference due to different configurations or performances, and may include one or more central processing units (CPUs) 1001 and one or more memories 1002, where at least one instruction is stored in the memories 1002, and the at least one instruction is loaded and executed by the central processing units 1001 to realize the video rating method provided by the above method embodiments.

In an exemplary embodiment, a computer readable storage medium is also provided, such as a memory including instructions, and the above instructions may be executed by the central processing units to complete the video rating method in the above embodiments. For example, the computer readable storage medium may be a read-only memory (ROM), a random access memory (RAM), a compact disc read-only memory (CD-ROM), a magnetic tape, a floppy disk or an optical data storage device.

In an exemplary embodiment, an application program is further provided and includes one or more instructions, and the one or more instructions may be executed by the central processing units of the computer equipment to complete the video rating method provided in the above embodiments.

Those skilled in the art will readily think of other embodiments of the present disclosure after considering the specification and performing the application disclosed herein. The present disclosure is intended to cover any variations, purposes or adaptive changes of the present disclosure, the variations, purposes or adaptive changes conform to the general principles of the present disclosure and include the common general knowledge or conventional technical means in the technical field not disclosed by the present disclosure. The specification and the embodiments are exemplary, and a true scope and spirit of the present disclosure are indicated by the following claims.

It should be understood that the present disclosure is not limited to the precise structure that has been described above and illustrated in the accompanying drawings, and various modifications and changes may be made without departing from the scope of the present disclosure. The scope of the present disclosure is limited only by the appended claims.

What is claimed is:

1. A video rating method, comprising:
    acquiring features of multiple modals of a video;
    fusing the features of the multiple modals to acquire a target feature;
    for each candidate rating of at least one candidate rating of the video, acquiring a matching degree between rating embedding of the each candidate rating and the target feature, wherein the rating embedding is a vector representing the candidate rating; and
    selecting a candidate rating corresponding to rating embedding with a highest matching degree from the at least one candidate rating as a rating of the video according to the matching degree between rating embedding of each candidate rating and the target feature;
    wherein the acquiring the matching degree between the rating embedding of the each candidate rating and the target feature comprises:
    performing cross product on the rating embedding and the target feature to acquire a first result;
    inputting the first result to at least one first full connection layer to output a second result; and
    acquiring the matching degree according to the second result.

2. The video rating method according to claim 1, wherein the acquiring the matching degree according to the second result comprises any one of following operations:
    performing cross product on the second result and the rating embedding to acquire a third result, inputting the third result to at least one second full connection layer to output a fourth result, and calculating the matching degree by taking the second result and the fourth result into an activation function; or
    calculating the matching degree by taking the second result into an activation function.

3. The video rating method according to claim 1, wherein before acquiring the matching degree between the rating embedding of the each candidate rating and the target feature, the method further comprises:
    generating the rating embedding of each candidate rating in the at least one candidate rating according to a sequential relationship of the at least one candidate rating, wherein the sequential relationship indicates an inappropriate degree of videos corresponding to the at least one candidate rating for target age groups.

4. The video rating method according to claim 3, wherein the generating the rating embedding of the each candidate rating in the at least one candidate rating according to the sequential relationship of the at least one candidate rating comprises:
    for an i-th candidate rating of the at least one candidate rating, generating a first vector according to the i, wherein values of i dimensions in the first vector are first values, and the i is a positive integer; and
    generating rating embedding of the i-th candidate rating according to the first vector.

5. The video rating method according to claim 4, wherein the first vector comprises m dimensions, and values of the first i dimensions of the m dimensions are the first values, values of last (m-i) dimensions are second values, the m represents a total number of the at least one candidate rating, the m is a positive integer, and the m is greater than or equal to the i.

6. The video rating method according to claim 4, wherein the generating the rating embedding of the i-th candidate rating according to the first vector comprises:
    encoding values of respective dimensions in the first vector to acquire a second vector; and generating the rating embedding of the i-th candidate rating according to the second vector.

7. The video rating method according to claim 6, wherein the generating the rating embedding of the i-th candidate rating according to the second vector comprises:
   inputting the second vector to at least one third full connection layer to output the rating embedding of the i-th candidate rating.

8. The video rating method according to claim 6, wherein the encoding the values of the respective dimensions in the first vector to acquire the second vector comprises:
   for each dimension of the respective dimensions in the first vector, performing one-hot encoding on a value of the each dimension to acquire a one-hot encoding value of the each dimension; and
   splicing one-hot encoding values of the respective dimensions to acquire the second vector.

9. The video rating method according to claim 1, wherein the fusing the features of the multiple modals to acquire the target feature comprises:
   for each modal of the multiple modals, inputting a feature of the modal to a first neural layer corresponding to the modal to output a hidden layer feature of the modal; and
   splicing hidden layer features of the multiple modals to acquire the target feature.

10. The video rating method according to claim 9, wherein before inputting the feature of the modal to the first neural layer corresponding to the modal to output the hidden layer feature of the modal, the method further comprises:
    acquiring features of multiple modals of a sample video;
    for each modal of the multiple modals of the sample video, inputting a feature of the modal of the sample video to a first neural layer corresponding to the modal to output a hidden layer feature of the modal;
    splicing hidden layer features of the multiple modals of the sample video to acquire a target feature of the sample video;
    for each modal of the multiple modals of the sample video, inputting the target feature of the sample video to a second neural layer corresponding to the modal to output a restored feature of the modal of the sample video;
    acquiring a loss value of the modal according to a difference between the restored feature of the modal of the sample video and the feature of the modal; and
    adjusting parameters of first neural layers corresponding to the multiple modals according to loss values of the multiple modals.

11. A video rating device, comprising:
    one or more processors; and
    one or more memories; wherein
    the one or more processors are configured to read and execute instructions stored in the one or more memories to:
    acquire features of multiple modals of a video;
    fuse the features of the multiple modals to acquire a target feature;
    acquire a matching degree between rating embedding of each candidate rating and the target feature for the each candidate rating of at least one candidate rating of the video, wherein the rating embedding is a vector representing the candidate rating; and
    select a candidate rating corresponding to rating embedding with a highest matching degree from the at least one candidate rating as a rating of the video according to the matching degree between rating embedding of each candidate rating and the target feature;
    wherein the one or more processors are further configured to read and execute instructions stored in the one or more memories to:
    perform cross product on the rating embedding and the target feature to acquire a first result;
    input the first result to at least one first full connection layer to output a second result; and
    acquire the matching degree according to the second result.

12. The video rating device according to claim 11, wherein the one or more processors are further configured to read and execute instructions stored in the one or more memories to:
    perform cross product of the second result and the rating embedding to acquire a third result, input the third result to at least one second full connection layer to output a fourth result, and calculate the matching degree by taking the second result and the fourth result into an activation function; or
    calculate the matching degree by taking the second result into an activation function.

13. The video rating device according to claim 11, wherein the one or more processors are further configured to read and execute instructions stored in the one or more memories to:
    generate the rating embedding of each candidate rating in the at least one candidate rating according to a sequential relationship of the at least one candidate rating, wherein the sequential relationship represents an inappropriate degree of videos corresponding to the at least one candidate rating for target age groups.

14. The video rating device according to claim 13, wherein the one or more processors are further configured to read and execute instructions stored in the one or more memories to:
    generate a first vector according to the i for an i-th candidate rating of the at least one candidate rating, wherein values of i dimensions in the first vector are first values, and the i is a positive integer; and
    generate rating embedding of the i-th candidate rating according to the first vector.

15. The video rating device according to claim 14, wherein the first vector comprises m dimensions, and values of first i dimensions of the m dimensions are the first values, values of last (m-i) dimensions are second values, the m represents a total number of the at least one candidate rating, the m is a positive integer, and the m is greater than or equal to the i.

16. The video rating device according to claim 14, wherein the one or more processors are further configured to read and execute instructions stored in the one or more memories to:
    encode values of respective dimensions in the first vector to acquire a second vector; and
    generate the rating embedding of the i-th candidate rating according to the second vector.

17. The video rating device according to claim 16, wherein the one or more processors are further configured to read and execute instructions stored in the one or more memories to:
    input the second vector to at least one third full connection layer to output the rating embedding of the i-th candidate rating.

18. The video rating device according to claim 16, wherein the one or more processors are further configured to read and execute instructions stored in the one or more memories to:

for each dimension of respective dimensions in the first vector, perform one-hot encoding on a value of the dimension to acquire a one-hot encoding value of the dimension; and splice one-hot encoding values of the respective dimensions to acquire the second vector.

19. The video rating device according to claim 11, wherein the one or more processors are further configured to read and execute instructions stored in the one or more memories to:

for each modal of the multiple modals, input a feature of the modal to a first neural layer corresponding to the modal to output a hidden layer feature of the modal; and splice hidden layer features of the multiple modals to acquire the target feature.

20. The video rating device according to claim 19, wherein the one or more processors are further configured to read and execute instructions stored in the one or more memories to:

acquire features of multiple modals of a sample video;

for each modal of the multiple modals of the sample video, input a feature of the modal of the sample video to a first neural layer corresponding to the modal to output a hidden layer feature of the modal, splice hidden layer features of the multiple modals of the sample video to acquire a target feature of the sample video, input the target feature of the sample video to a second neural layer corresponding to the modal for each modal of the multiple modals of the sample video to output a restored feature of the modal of the sample video; and acquire a loss value of the modal according to a difference between the restored feature of the modal of the sample video and the feature of the modal; and adjust parameters of first neural layers corresponding to the multiple modals according to loss values of the multiple modals.

21. A non-transitory computer readable storage medium, wherein instructions in the storage medium are executed by one or more processors of computer equipment to enable the computer equipment to execute the video rating method according to claim 1.

* * * * *